United States Patent
Handorf et al.

(10) Patent No.: US 9,524,506 B2
(45) Date of Patent: Dec. 20, 2016

(54) METHODS AND APPARATUS FOR MAINTAINING BUSINESS RULES IN A CONFIGURATION SYSTEM

(75) Inventors: Timothy William Handorf, Trevor, WI (US); Christopher Haussler, Arlington Heights, IL (US); Martin Daniel Duffy, Elk Grove Village, IL (US)

(73) Assignee: BIGMACHINES, INC., Deerfield, IL (US)

( * ) Notice: Subject to any disclaimer, the term of this patent is extended or adjusted under 35 U.S.C. 154(b) by 0 days.

(21) Appl. No.: 13/279,015

(22) Filed: Oct. 21, 2011

(65) Prior Publication Data

US 2013/0103806 A1    Apr. 25, 2013

(51) Int. Cl.
*G06F 15/177*    (2006.01)
*G06Q 30/02*    (2012.01)

(52) U.S. Cl.
CPC .................. *G06Q 30/0205* (2013.01)

(58) Field of Classification Search
None
See application file for complete search history.

(56) References Cited

U.S. PATENT DOCUMENTS

| | | |
|---|---|---|
| 4,853,850 A | 8/1989 | Krass, Jr. et al. |
| 4,942,356 A | 7/1990 | Ellingen et al. |
| 5,060,401 A | 10/1991 | Whatley |
| 5,111,927 A | 5/1992 | Schulze, Jr. |
| 5,129,656 A | 7/1992 | Marte et al. |
| 5,225,987 A | 7/1993 | Thompson |
| 5,279,051 A | 1/1994 | Whatley |
| 5,283,865 A | 2/1994 | Johnson |
| 5,307,261 A | 4/1994 | Maki et al. |
| 5,311,424 A | 5/1994 | Mukherjee et al. |
| 5,367,627 A | 11/1994 | Johnson |
| 5,412,730 A | 5/1995 | Jones |
| 5,483,049 A | 1/1996 | Schulze, Jr. |
| 5,493,490 A | 2/1996 | Johnson |

(Continued)

FOREIGN PATENT DOCUMENTS

| | | |
|---|---|---|
| GB | 2359157 | 8/2001 |
| JP | 2004259070 | 9/2004 |

(Continued)

OTHER PUBLICATIONS

PRNewswire 2004 "Price History", http://www.prnewswire.com/news-releases/model-n-announces-breakthrough-revenue-management-suite-for-pharmaceutical-companies-72702922.html.

(Continued)

*Primary Examiner* — Farid Homayounmehr
*Assistant Examiner* — Maung Lwin
(74) *Attorney, Agent, or Firm* — Vista IP Law Group, LLP

(57) ABSTRACT

Methods and apparatus for maintaining businesses rules in a configuration system are disclosed. The presently disclosed system allows systems to be configured using a plurality of rules that are syndicated by a plurality of different manufacturers. Each manufacturer syndicates a portion of the overall system attributes and/or configuration rule set for use by others. Configuration users, such as the sales channel, may then create additional rules and/or configure products with the most recent version of the component attributes and configuration rules, and no single entity is burdened with maintaining the entire attribute and/or rule set.

18 Claims, 4 Drawing Sheets

(56) References Cited

U.S. PATENT DOCUMENTS

| | | | |
|---|---|---|---|
| 5,500,802 A | 3/1996 | Morris et al. | |
| 5,500,934 A | 3/1996 | Austin et al. | |
| 5,615,342 A | 3/1997 | Johnson | |
| 5,617,514 A | 4/1997 | Dolby et al. | |
| 5,623,637 A | 4/1997 | Jones et al. | |
| 5,625,776 A | 4/1997 | Johnson | |
| 5,630,025 A | 5/1997 | Dolby et al. | |
| 5,745,765 A | 4/1998 | Paseman | |
| 5,758,331 A | 5/1998 | Johnson | |
| 5,819,302 A | 10/1998 | Nielsen | |
| 5,825,651 A | 10/1998 | Gupta et al. | |
| 5,844,554 A | 12/1998 | Geller et al. | |
| 5,877,966 A | 3/1999 | Morris et al. | |
| 5,909,533 A | 6/1999 | Kitabayashi et al. | |
| 5,963,953 A | 10/1999 | Cram et al. | |
| 5,987,480 A | 11/1999 | Donohue et al. | |
| D421,694 S | 3/2000 | Kitabayashi et al. | |
| 6,035,305 A | 3/2000 | Strevey et al. | |
| 6,049,822 A | 4/2000 | Mittal | |
| 6,061,697 A | 5/2000 | Nakao | |
| 6,067,087 A | 5/2000 | Krauss | |
| 6,067,525 A | 5/2000 | Johnson et al. | |
| D431,156 S | 9/2000 | Lewis et al. | |
| 6,119,102 A | 9/2000 | Rush et al. | |
| 6,141,658 A | 10/2000 | Mehr et al. | |
| D434,601 S | 12/2000 | Lewis et al. | |
| 6,167,383 A * | 12/2000 | Henson | 705/26.5 |
| 6,169,979 B1 | 1/2001 | Johnson | |
| 6,177,932 B1 | 1/2001 | Galdes et al. | |
| 6,178,362 B1 | 1/2001 | Woolard et al. | |
| 6,182,059 B1 | 1/2001 | Angotti et al. | |
| D438,061 S | 2/2001 | Lewis et al. | |
| D438,062 S | 2/2001 | Lewis et al. | |
| 6,199,067 B1 | 3/2001 | Geller | |
| 6,205,446 B1 | 3/2001 | Mittal et al. | |
| 6,233,564 B1 | 5/2001 | Schulze, Jr. | |
| 6,233,609 B1 | 5/2001 | Mittal | |
| 6,278,996 B1 | 8/2001 | Richardson et al. | |
| 6,289,340 B1 | 9/2001 | Puram et al. | |
| 6,311,149 B1 | 10/2001 | Ryan et al. | |
| 6,370,882 B1 | 4/2002 | Adamski et al. | |
| 6,397,219 B2 | 5/2002 | Mills | |
| 6,411,947 B1 | 6/2002 | Rice et al. | |
| 6,430,609 B1 | 8/2002 | Dewhurst et al. | |
| 6,438,547 B1 | 8/2002 | Mehr et al. | |
| 6,453,255 B1 | 9/2002 | Smorodinsky et al. | |
| 6,453,302 B1 | 9/2002 | Johnson et al. | |
| 6,460,077 B2 | 10/2002 | Mittal | |
| 6,480,859 B2 | 11/2002 | Mittal et al. | |
| 6,497,360 B1 | 12/2002 | Schulze, Jr. | |
| 6,510,352 B1 | 1/2003 | Badavas et al. | |
| 6,512,361 B1 | 1/2003 | Becker | |
| 6,535,896 B2 | 3/2003 | Britton et al. | |
| 6,535,913 B2 | 3/2003 | Mittal et al. | |
| 6,567,729 B2 | 5/2003 | Betters et al. | |
| 6,577,962 B1 | 6/2003 | Afshari | |
| 6,598,052 B1 | 7/2003 | Saulpaugh et al. | |
| 6,611,844 B1 | 8/2003 | Saulpaugh et al. | |
| 6,633,863 B1 | 10/2003 | Sorensen Moller et al. | |
| 6,636,893 B1 | 10/2003 | Fong | |
| 6,668,354 B1 | 12/2003 | Chen et al. | |
| D487,825 S | 3/2004 | Kim et al. | |
| 6,732,027 B2 | 5/2004 | Betters et al. | |
| 6,776,151 B2 | 8/2004 | Wiersma et al. | |
| 6,789,252 B1 | 9/2004 | Burke et al. | |
| 6,799,299 B1 | 9/2004 | Li et al. | |
| 6,813,531 B2 | 11/2004 | Coale et al. | |
| 6,826,572 B2 | 11/2004 | Colace | |
| 6,836,766 B1 | 12/2004 | Gilpin et al. | |
| 6,859,699 B2 | 2/2005 | Carroll et al. | |
| 6,901,595 B2 | 5/2005 | Mukundan et al. | |
| 6,915,253 B1 | 7/2005 | Chapman | |
| 6,917,304 B1 | 7/2005 | Jones et al. | |
| 6,941,305 B2 | 9/2005 | Magouirk et al. | |
| 6,959,236 B2 | 10/2005 | Betters et al. | |
| 6,981,212 B1 | 12/2005 | Claussen et al. | |
| 6,981,222 B2 | 12/2005 | Rush et al. | |
| 6,983,187 B2 | 1/2006 | Kern | |
| 6,996,776 B1 | 2/2006 | Makely et al. | |
| 6,996,781 B1 | 2/2006 | Myers et al. | |
| 7,003,360 B1 | 2/2006 | Dillon | |
| 7,003,548 B1 | 2/2006 | Barck et al. | |
| 7,039,602 B1 | 5/2006 | Kapadia et al. | |
| 7,039,859 B1 | 5/2006 | Sundaresan | |
| 7,043,320 B1 | 5/2006 | Roumeliotis et al. | |
| 7,062,478 B1 * | 6/2006 | Huelsman et al. | 706/47 |
| 7,080,083 B2 | 7/2006 | Kim et al. | |
| 7,084,735 B2 | 8/2006 | Kapolka | |
| 7,086,002 B2 | 8/2006 | Elo et al. | |
| 7,089,127 B2 | 8/2006 | Thibedeau et al. | |
| 7,117,436 B1 | 10/2006 | O'Rourke et al. | |
| 7,127,313 B2 | 10/2006 | Neri | |
| 7,127,705 B2 | 10/2006 | Christfort et al. | |
| 7,143,344 B2 | 11/2006 | Parker et al. | |
| 7,155,667 B1 | 12/2006 | Kotler et al. | |
| 7,165,041 B1 | 1/2007 | Guheen et al. | |
| 7,167,876 B2 | 1/2007 | Cookson et al. | |
| 7,188,075 B1 | 3/2007 | Smirnov | |
| 7,188,335 B1 | 3/2007 | Darr et al. | |
| 7,188,527 B2 | 3/2007 | Jones et al. | |
| 7,191,394 B1 | 3/2007 | Ardeleanu et al. | |
| 7,219,081 B1 * | 5/2007 | Davis et al. | 705/37 |
| 7,225,038 B2 | 5/2007 | Kind | |
| 7,225,818 B2 | 6/2007 | Kim et al. | |
| 7,257,579 B2 | 8/2007 | Wachholz-Prill | |
| 7,277,925 B2 | 10/2007 | Warnock | |
| 7,293,237 B1 | 11/2007 | Knight et al. | |
| 7,308,646 B1 | 12/2007 | Cohen et al. | |
| 7,343,584 B1 | 3/2008 | Plain et al. | |
| 7,353,192 B1 | 4/2008 | Ellis et al. | |
| 7,359,777 B2 | 4/2008 | Betters et al. | |
| 7,360,071 B2 | 4/2008 | Ewing et al. | |
| 7,380,204 B2 | 5/2008 | Lomelin-Stoupignan et al. | |
| 7,386,832 B2 | 6/2008 | Brunner et al. | |
| 7,389,471 B2 | 6/2008 | Croney et al. | |
| 7,398,233 B1 | 7/2008 | Bayer et al. | |
| 7,406,359 B2 | 7/2008 | Roumeliotis et al. | |
| 7,415,010 B1 | 8/2008 | Croak et al. | |
| 7,415,482 B2 | 8/2008 | Blake et al. | |
| 7,437,432 B2 | 10/2008 | Bodin et al. | |
| 7,457,789 B2 | 11/2008 | Axling | |
| 7,467,122 B2 | 12/2008 | Morita et al. | |
| 7,505,921 B1 | 3/2009 | Lukas et al. | |
| 7,516,088 B2 | 4/2009 | Johnson et al. | |
| 7,519,549 B1 | 4/2009 | Johnson et al. | |
| 7,580,871 B2 | 8/2009 | Brunner et al. | |
| 7,584,079 B2 | 9/2009 | Lichtenberg et al. | |
| 7,590,944 B2 | 9/2009 | Weber et al. | |
| 7,606,739 B1 | 10/2009 | Johnson | |
| 7,620,711 B2 * | 11/2009 | Boese | G06Q 10/06 705/51 |
| 7,627,745 B2 | 12/2009 | Martinez et al. | |
| 7,631,299 B2 | 12/2009 | Kannenberg | |
| 7,650,296 B1 | 1/2010 | Brunner et al. | |
| 7,657,386 B2 | 2/2010 | Thibedeau et al. | |
| 7,685,507 B2 | 3/2010 | Workman et al. | |
| 7,689,904 B2 | 3/2010 | Ritter | |
| 7,703,092 B1 | 4/2010 | Glaser et al. | |
| 7,788,591 B2 | 8/2010 | Brunner et al. | |
| 7,818,082 B2 | 10/2010 | Roumeliotis et al. | |
| 7,822,632 B2 | 10/2010 | Bayer et al. | |
| 7,844,495 B2 | 11/2010 | Verchere | |
| 7,941,341 B2 | 5/2011 | Johnson et al. | |
| 7,949,578 B2 | 5/2011 | Johnson et al. | |
| 8,078,489 B1 * | 12/2011 | Marsten | G06Q 10/04 705/7.25 |
| 8,112,377 B2 | 2/2012 | Schmidt | |
| 8,121,904 B2 | 2/2012 | Johnson | |
| 8,122,432 B2 | 2/2012 | Brunn et al. | |
| 8,131,487 B2 | 3/2012 | Thibedeau et al. | |
| 8,166,385 B2 | 4/2012 | Garcia-Molina et al. | |
| 8,245,020 B1 | 8/2012 | Gupta | |
| 8,266,015 B2 | 9/2012 | Johnson et al. | |
| 8,271,355 B2 | 9/2012 | Johnson et al. | |

(56) References Cited

U.S. PATENT DOCUMENTS

| | | | |
|---|---|---|---|
| 8,290,822 B2 | 10/2012 | Gade et al. | |
| 8,341,011 B2 | 12/2012 | Veit | |
| 8,538,786 B2 | 9/2013 | Linehan | |
| 8,548,867 B2 | 10/2013 | Gade et al. | |
| 9,213,965 B1* | 12/2015 | Brooks | G06Q 10/0875 |
| 2001/0056460 A1 | 12/2001 | Sahota et al. | |
| 2002/0010598 A1 | 1/2002 | Johnson et al. | |
| 2002/0026447 A1 | 2/2002 | Matsutsuka et al. | |
| 2002/0035463 A1 | 3/2002 | Lynch et al. | |
| 2002/0042749 A1 | 4/2002 | Yugami et al. | |
| 2002/0073001 A1* | 6/2002 | Palmer et al. | 705/29 |
| 2002/0078435 A1 | 6/2002 | Liu et al. | |
| 2002/0087432 A1 | 7/2002 | Muniz | |
| 2002/0121095 A1 | 9/2002 | Adamski et al. | |
| 2002/0123878 A1 | 9/2002 | Menke | |
| 2002/0133433 A1* | 9/2002 | Hall | G06Q 30/02 705/26.5 |
| 2002/0165701 A1* | 11/2002 | Lichtenberg | G06F 17/5095 703/7 |
| 2003/0028449 A1 | 2/2003 | Heinen et al. | |
| 2003/0033377 A1 | 2/2003 | Chatterjee et al. | |
| 2003/0172343 A1 | 9/2003 | Leymaster et al. | |
| 2004/0010496 A1 | 1/2004 | Behrendt et al. | |
| 2004/0249664 A1 | 12/2004 | Broverman et al. | |
| 2004/0255233 A1 | 12/2004 | Croney et al. | |
| 2005/0055633 A1 | 3/2005 | Ali et al. | |
| 2005/0102612 A1 | 5/2005 | Allan et al. | |
| 2005/0108633 A1 | 5/2005 | Sahota et al. | |
| 2005/0138078 A1 | 6/2005 | Christenson et al. | |
| 2005/0144087 A1 | 6/2005 | Huang et al. | |
| 2005/0160359 A1 | 7/2005 | Falk et al. | |
| 2005/0204281 A1 | 9/2005 | Choate | |
| 2005/0240451 A1 | 10/2005 | Johnson et al. | |
| 2006/0077992 A1* | 4/2006 | Gale | H04L 67/322 370/408 |
| 2006/0129929 A1 | 6/2006 | Weber et al. | |
| 2006/0155654 A1 | 7/2006 | Plessis et al. | |
| 2006/0166642 A1 | 7/2006 | Puthenpura et al. | |
| 2006/0168540 A1 | 7/2006 | Cejka et al. | |
| 2006/0178973 A1 | 8/2006 | Chiovari et al. | |
| 2006/0294459 A1 | 12/2006 | David et al. | |
| 2007/0074106 A1 | 3/2007 | Ardeleanu et al. | |
| 2007/0074127 A1 | 3/2007 | Acker et al. | |
| 2007/0083533 A1 | 4/2007 | Mirkazemi et al. | |
| 2007/0203771 A1 | 8/2007 | Caballero et al. | |
| 2007/0226066 A1 | 9/2007 | Brunner et al. | |
| 2007/0294100 A1 | 12/2007 | Chen et al. | |
| 2008/0005287 A1 | 1/2008 | Harvey et al. | |
| 2008/0066052 A1 | 3/2008 | Wolfram | |
| 2008/0086682 A1 | 4/2008 | Derricott et al. | |
| 2008/0126221 A1* | 5/2008 | Swanson | G06Q 10/0875 705/26.5 |
| 2008/0208606 A1 | 8/2008 | Allsop et al. | |
| 2008/0320114 A1* | 12/2008 | Bodin | G06Q 10/02 709/220 |
| 2009/0012854 A1 | 1/2009 | Altice et al. | |
| 2009/0019422 A1* | 1/2009 | Loughlin et al. | 717/106 |
| 2009/0050186 A1 | 2/2009 | Kim et al. | |
| 2009/0089174 A1 | 4/2009 | Brunner et al. | |
| 2010/0010917 A1* | 1/2010 | Bagwell et al. | 705/27 |
| 2010/0036747 A1 | 2/2010 | Bagley et al. | |
| 2010/0037142 A1 | 2/2010 | Bagley et al. | |
| 2010/0037159 A1 | 2/2010 | Bagley et al. | |
| 2010/0037162 A1 | 2/2010 | Bagley et al. | |
| 2010/0088590 A1* | 4/2010 | Bajohr et al. | 715/235 |
| 2010/0131872 A1 | 5/2010 | Bagley et al. | |
| 2010/0161385 A1 | 6/2010 | Karypis et al. | |
| 2010/0223215 A1 | 9/2010 | Karypis | |
| 2010/0281429 A1* | 11/2010 | Kheiri et al. | 715/822 |
| 2010/0293042 A1 | 11/2010 | McManus et al. | |
| 2010/0318412 A1 | 12/2010 | Karypis et al. | |
| 2011/0098835 A1* | 4/2011 | Yucel et al. | 700/103 |
| 2011/0208618 A1 | 8/2011 | Christenson et al. | |
| 2011/0246322 A1 | 10/2011 | Wulteputte et al. | |
| 2011/0264486 A1 | 10/2011 | Johnson et al. | |
| 2011/0301984 A1 | 12/2011 | Johnson et al. | |
| 2011/0307294 A1 | 12/2011 | Barkai et al. | |
| 2012/0030069 A1* | 2/2012 | Garg | G06Q 30/02 705/27.1 |
| 2012/0042242 A1 | 2/2012 | Garland et al. | |
| 2012/0047045 A1* | 2/2012 | Gopikrishna | G06Q 10/10 705/26.5 |
| 2012/0102421 A1 | 4/2012 | Handorf et al. | |
| 2012/0123898 A1 | 5/2012 | Kirkeby et al. | |
| 2012/0143721 A1 | 6/2012 | Hutchinson et al. | |
| 2012/0215636 A1* | 8/2012 | Ross | G06Q 20/12 705/14.53 |
| 2012/0221429 A1 | 8/2012 | Verchere | |
| 2012/0232979 A1 | 9/2012 | Bous | |
| 2012/0271730 A1 | 10/2012 | McNall et al. | |

FOREIGN PATENT DOCUMENTS

| | | |
|---|---|---|
| WO | WO0150349 | 7/2001 |
| WO | WO0190873 | 11/2001 |
| WO | WO2004075466 | 9/2004 |
| WO | WO2007127857 | 11/2007 |

OTHER PUBLICATIONS

Krell 2005, "Price Change", krell-software.com/omniaudit/data_auditing_for_sarbanes_oxley_printable.asp.

International Search Report and Written Opinion of the International Searching Authority for International Application No. PCT/US10/33217 dated Jan. 27, 2011.

* cited by examiner

METHODS AND APPARATUS FOR MAINTAINING BUSINESS RULES IN A CONFIGURATION SYSTEM

TECHNICAL FIELD

The present disclosure relates in general to system configuration, and, in particular, to methods and apparatus for maintaining businesses rules in a configuration system.

BACKGROUND

Often, systems have multiple options. However, those options may not all be compatible with each other. For example, a person may be selecting components for a new personal computer. If the person (e.g., end-user) chooses a certain peripheral (e.g., graphics card) for the computer, that peripheral may require a certain minimum amount of memory and/or CPU speed. Configuration software may be used to assist the end-user and enforce these rules. However, present configuration systems have certain drawbacks.

The configuration of complex systems typically requires a large number of rules. Maintaining these rules is burdensome. When new configuration options are added to the system, existing rules may need to be modified, and new rules may need to be added. This problem is compounded when different components in the system come from different manufactures, because the information needed to generate the rules may not be available.

SUMMARY

The presently disclosed system solves this problem by allowing systems to be configured using a plurality of rules that are syndicated by a plurality of different manufacturers. Each manufacturer syndicates a portion of the overall system attributes and/or configuration rule set for use by others. For example, a sales channel (e.g., of computers) may receive (push or pull) system configuration rules from multiple component manufacturers (e.g., manufacturers of CPUs, memory cards, graphic cards, etc.). The sales channel may then create additional rules and/or configure the system with the most up to date version of the component attributes and configuration rules, and no single entity is burdened with maintaining the entire attribute and/or rule set.

DETAILED DESCRIPTION OF EXEMPLARY EMBODIMENTS

Figure 1:
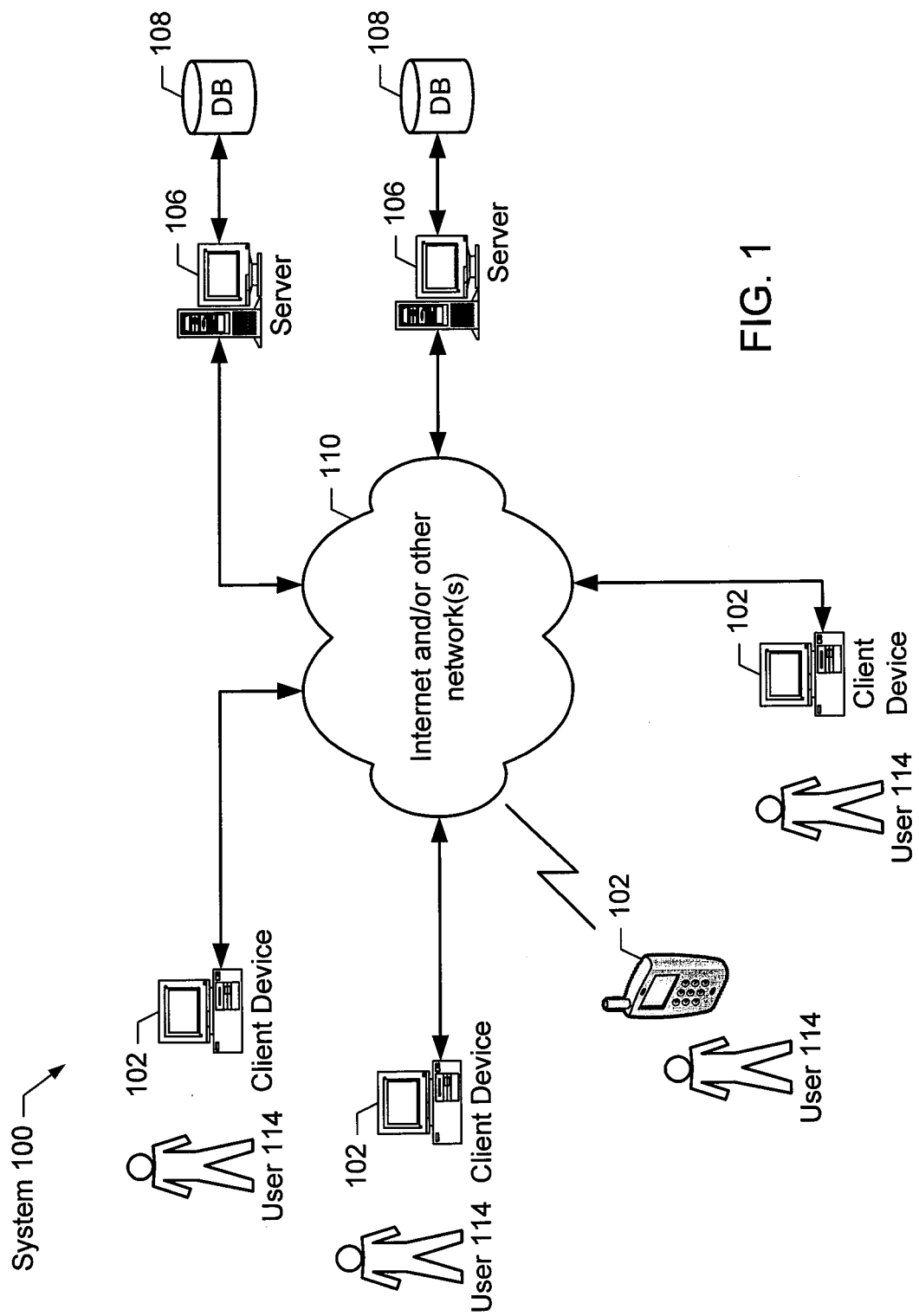
FIG. 1 is a high level block diagram of an example communications system.

The present system is most readily realized in a network communications system. A high level block diagram of an exemplary network communications system 100 is illustrated in FIG. 1. The illustrated system 100 includes one or more client devices 102, one or more web servers 106, and one or more databases 108. Each of these devices may communicate with each other via a connection to one or more communications channels 110 such as the Internet or some other wired and/or wireless data network, including, but not limited to, any suitable wide area network or local area network. It will be appreciated that any of the devices described herein may be directly connected to each other instead of over a network.

The web server 106 stores a plurality of files, programs, and/or web pages in one or more databases 108 for use by the client devices 102 as described in detail below. The database 108 may be connected directly to the web server 106 and/or via one or more network connections. The database 108 stores data as described in detail below.

One web server 106 may interact with a large number of client devices 102. Accordingly, each server 106 is typically a high end computer with a large storage capacity, one or more fast microprocessors, and one or more high speed network connections. Conversely, relative to a typical server 106, each client device 102 typically includes less storage capacity, a single microprocessor, and a single network connection.

Figure 2:
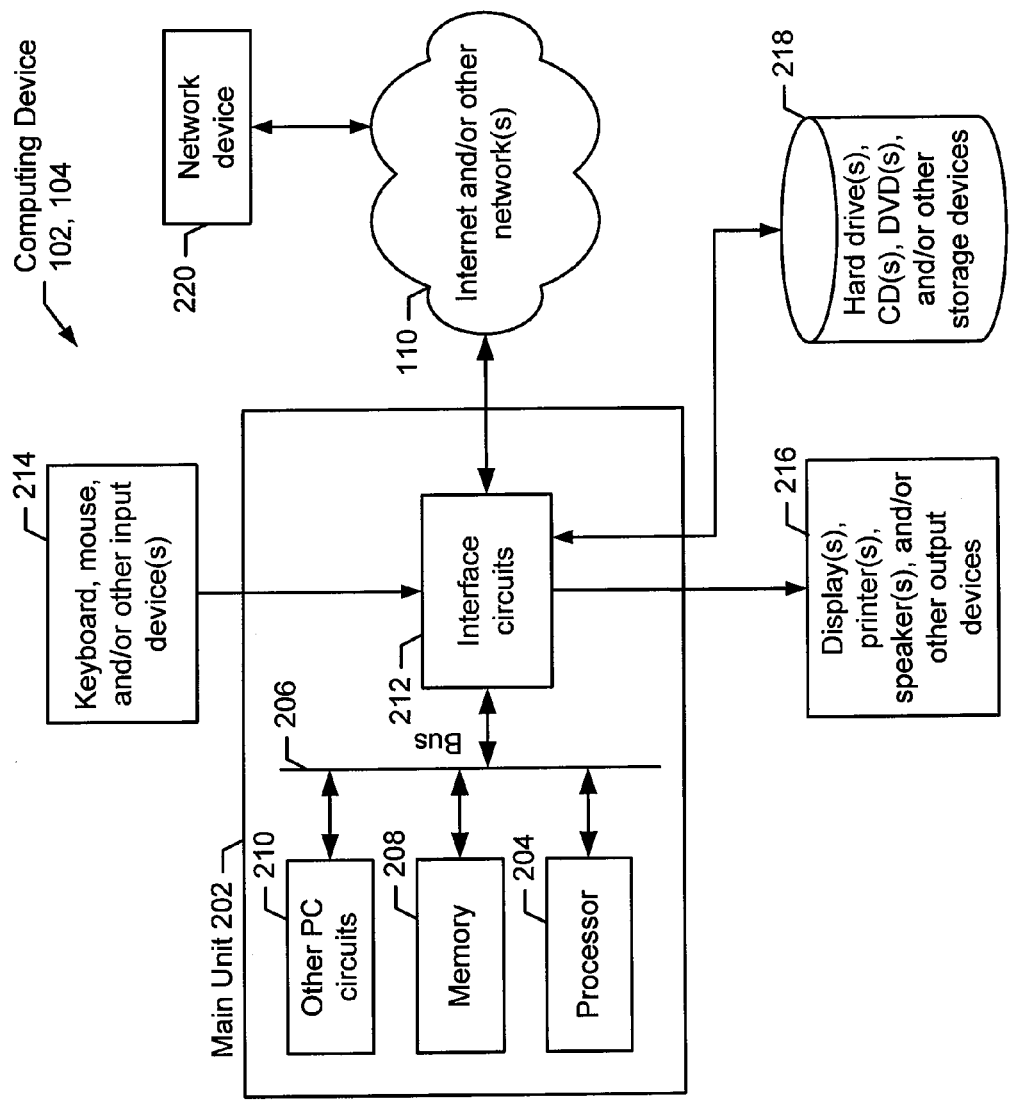
FIG. 2 is a more detailed block diagram showing one example of a computing device.

A more detailed block diagram of the electrical systems of a computing device (e.g., client device 102 and/or server 106) is illustrated in FIG. 2. Although the electrical systems of a client device 102 and a typical server 106 may be similar, the structural differences between the two types of devices are well known.

The client device 102 may include a personal computer (PC), a personal digital assistant (PDA), an Internet appliance, a cellular telephone, or any other suitable communication device. The client device 102 includes a main unit 202 which preferably includes one or more processors 204 electrically coupled by an address/data bus 206 to one or more memory devices 208, other computer circuitry 210, and one or more interface circuits 212. The processor 204 may be any suitable processor. The memory 208 preferably includes volatile memory and non-volatile memory. Preferably, the memory 208 stores a software program that interacts with the other devices in the system 100 as described below. This program may be executed by the processor 204 in any suitable manner. The memory 208 may also store digital data indicative of documents, files, programs, web pages, etc. retrieved from a server 106 and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays, printers, speakers, and/or other output devices 216 may also be connected to the main unit 202 via the interface circuit 212. The display 216 may be a cathode ray tube (CRTs), liquid crystal displays (LCDs), or any other type of display. The display 216 generates visual displays of data generated during operation of the client device 102. For example, the display 216 may be used to display web pages and/or desktop pop-up data received from the server 106. The visual displays may include prompts for human input, run time statistics, calculated values, data, etc.

One or more storage devices 218 may also be connected to the main unit 202 via the interface circuit 212. For example, a hard drive, CD drive, DVD drive, and/or other storage devices may be connected to the main unit 202. The storage devices 218 may store any type of data used by the client device 102.

The client device 102 may also exchange data with other network devices 220 via a connection to the network 110. The network connection may be any type of network connection, such as an Ethernet connection, digital subscriber line (DSL), telephone line, coaxial cable, etc. Users 114 (e.g., end-users and/or configuration users) of the system 100 may be required to register with the server 106. In such an instance, each user 114 may choose a user identifier (e.g., e-mail address) and a password which may be required for the activation of services. The user identifier and password may be passed across the network 110 using encryption built into the user's browser. Alternatively, the user identifier and/or password may be assigned by the server 106.

Figure 3:
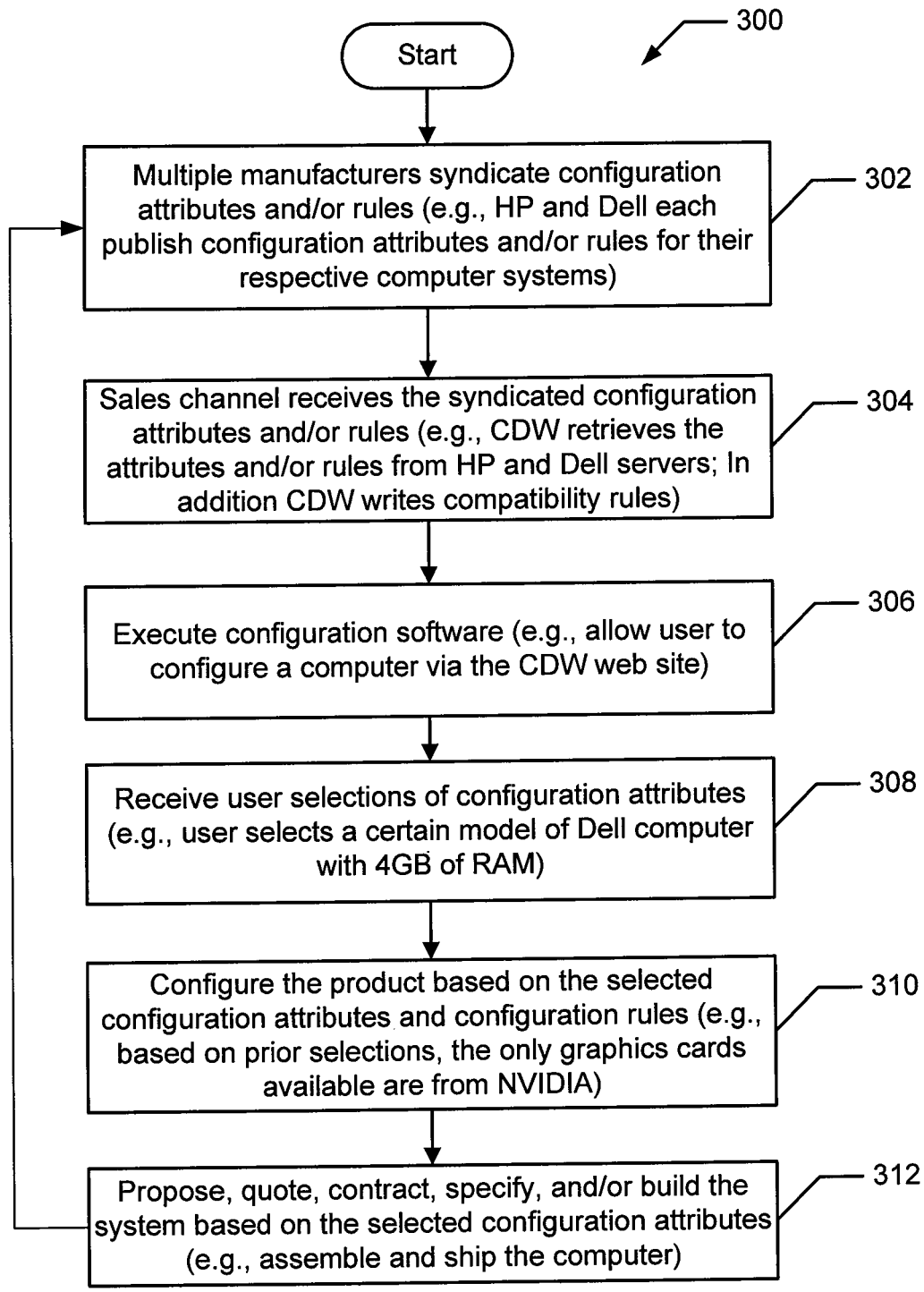
FIG. 3 is a flowchart of an example process to maintain businesses rules in a configuration system.

A flowchart of an example process 300 for maintaining businesses rules in a configuration system is illustrated in FIG. 3. Preferably, the process 300 is embodied in one or more software programs which is stored in one or more memories and executed by one or more processors. Although the process 300 is described with reference to the flowchart illustrated in FIG. 3, it will be appreciated that many other methods of performing the acts associated with process 300 may be used. For example, the order of many of the steps may be changed, and many of the steps described are optional.

In general, the process 300 allows systems to be configured using a plurality of attributes and rules that are syndicated by a plurality of different manufactures. The process 300 preferably begins with a plurality of manufacturers syndicating their respective attributes and/or configuration rules (block 302), which are then received by one or more sales channels (e.g., CDW) (block 304). For example, HP may publish one rule that says their model HP-1 computer must be configured with at least 2 GB of RAM if you want to use the NVIDIA G1 graphics card and another rule that says their model HP-2 computer must be configured with at least 4 GB of RAM if you want to use the NVIDIA G1 graphics card. Similarly, Dell may publish one rule that says their model D-1 computer must be configured with at least 4 GB of RAM if you want to use the NVIDIA G1 graphics card and another rule that says their model D-2 computer is never compatible with the NVIDIA G1 graphics card no matter how much RAM is installed. In addition, CDW may write certain rules regarding the compatibility of certain system attributes from various manufactures such as HP and Dell.

These attributes and business rules may be any type of business rule and may apply to things that are not systems or products. For example, the business rules may be bill of materials (BOM) rules, pricing rules, hiding rules, recommendation rules, constraint rules, recommended items rules, etc.

For each configuration, the end-user can create a bill of materials. When a BOM rule triggers, it appears to the end-user (e.g., buyer) on a commerce document line item pages.

Pricing rules may be used to calculate a price based on how a product is configured. The designer can create a smart pricing system by generating business rules for configurable attributes that add pricing to products. Pricing rules can be based on a combination of one or more configured values.

Hidden attribute rules tell the system to hide certain attributes when a pre-defined condition is met. Using hidden attribute rules, the designer can reduce the number of rules needed for a configuration process because the designer can include disparate attribute types in a single flow rule and how one set of attributes or another based on some condition.

Recommendation rules can be used to help end-users configure products by offering suggested attributes values. For each configuration, where a model or part would likely have a certain attribute value, the designer can create a recommendation. When recommendations trigger, they preferably appear to end-users. For example, the recommendation may display as text next to a configurable attribute that has a recommended value. For attributes with a set or forced option enabled, recommendation values automatically auto-populate the configurable attribute fields.

Constraint rules are set-up to warn an end-user when a certain attribute value will not work in a configuration. These rules may be used to reduce errors in the configuration process. For example, if the end-user is configuring an automobile and the end-user selects a blue exterior color, a constraint may run that only allows the end-user to select tan as an interior color. While a constraint is active, the system typically does not allow the end-user to advance to commerce (e.g., a purchase screen).

Recommended item rules enable a designer to associate extra sets of parts and models with products based on user-configured values. If the recommended item is mandatory, then the end-user must select (e.g. purchase) the configured model with the recommended item. Preferably, there is no way to delete the item association in the commerce process. If the item is not mandatory, then the end-user can opt to not buy the recommended item.

Figure 4:
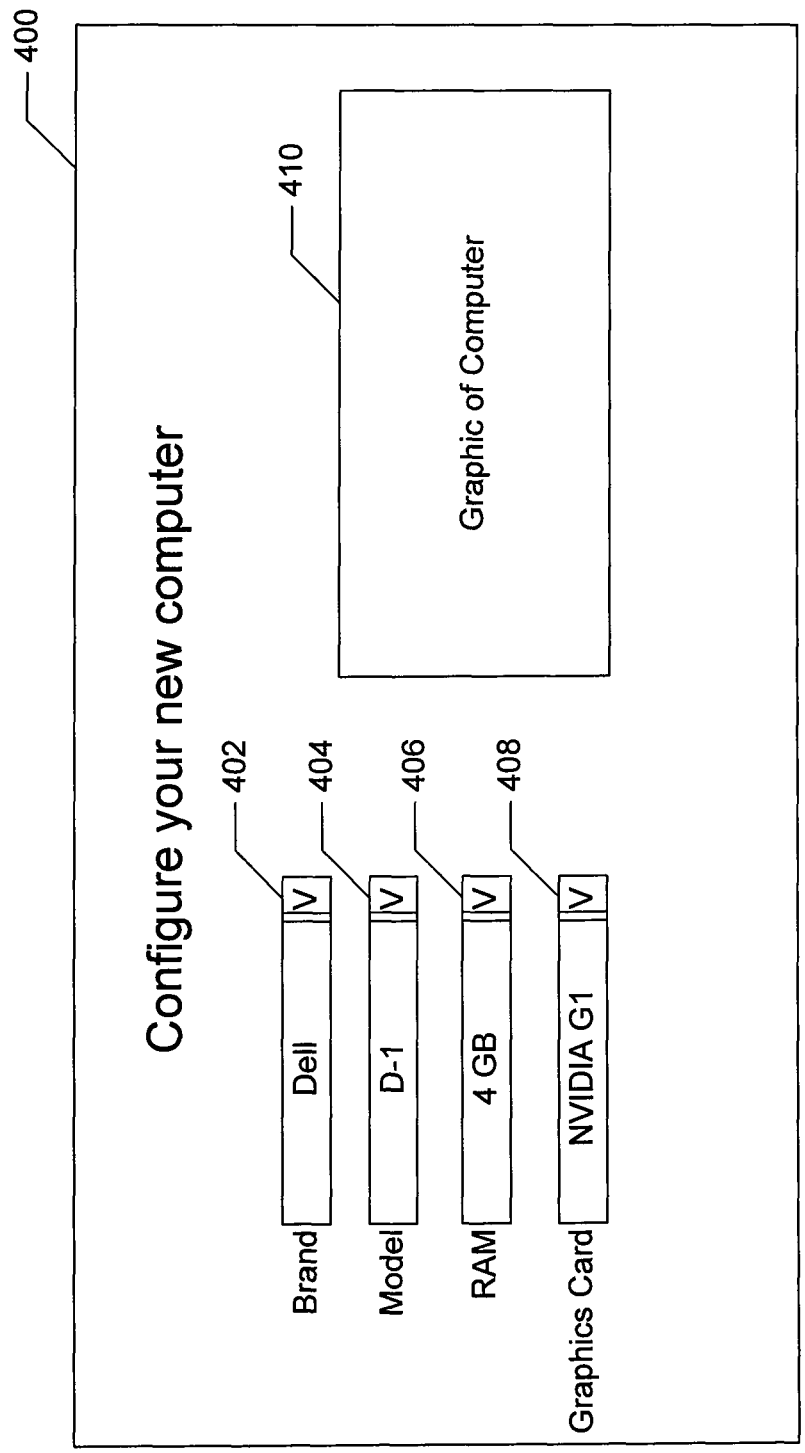
FIG. 4 is an example run-time display of a system configurator applying the syndicated businesses rules.

Preferably, the business rules (e.g., system configuration rules) are stored as a plurality of if-then statements relating certain attributes to other attributes. For example, "If Brand='Dell' and Model='D-2' Then NvidiaBrand='No'. These if-then statements are then used when the configuration software is executed (block 306). For example, an end-user may go to a web site 400 to configure a computer (see FIG. 4). During the configuration the end-user enters a plurality of configuration attributes (block 308). For example, the end-user may select a Dell brand computer (via drop-down box 402), model D-1 (via drop-down box 404), with a 4 GB of RAM (via drop-down box 406). It will be appreciated that any suitable input mechanism may be used such as check boxes, radio buttons, etc.

The product is interactively configured based on the selected configuration attributes and configuration rules (block 310). For example, if the end-user selected a Dell model D-1 with 4 GB of RAM, one of the available graphics cards may be the NVIDIA G1. Accordingly, the NVIDIA G1 is one of the choices available for selection in the graphics card drop-down box 408. Non-selectable choices may be excluded (e.g., not included in the drop-down box) or included (e.g., dimmed and not selectable).

If the end-user changes a choice in one drop-down box, the other drop-down boxes may also change based on a business rules table and the corresponding if-then statements relating certain attributes to other attributes. For example, if the end-user changes from a 4 GB of RAM to 8 GB of RAM, additional video cards may become available. In another example, one attribute selection may require another attribute selection. For example, one computer part may require another computer part for installation. In such an instance, the configuration software preferably enforces this relationship for the end-user. These attributes and or rules may be provided by each manufacturer and/or a configuration user such as the sales channel. For example, a retail channel may provide a rule relating the compatibility of one manufacturer's product to another manufacturer's product.

Once the end-user's selections are complete and the configuration rules are satisfied, a proposal, quote, contract, and/or specification associated with the system may be automatically generated, and/or the system may be built in accordance with the selected configuration parameters (block 312). For example, the computer may be assembled (or selected from inventory) and delivered to the customer.

In summary, persons of ordinary skill in the art will readily appreciate that methods and apparatus for maintaining businesses rules in a configuration system have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of configuring a system, the method comprising:
    providing a configuration system for receiving and consolidating one or more configuration rules pertaining to configuration attributes of products from a plurality of manufacturers,
        the configuration attributes being selectable component configuration parameters, and the configuration rules comprising logic that analyzes whether a first configuration attribute is compatible with a second configuration attribute,
            wherein the configuration rules associated with the plurality of manufacturers are not maintained at the configuration system but rather are maintained by the plurality of manufacturers, and
            wherein the configuration system maintains non-manufacturer rules in addition to the one or more configuration rules received from the plurality of manufacturers, the non-manufacturer configuration rules pertaining to the configuration attributes from the one or more configuration rules received from the plurality of manufacturers;
    receiving, at the configuration system, a first configuration rule from a first manufacturer, the first configuration rule pertaining to a first product associated with the first manufacturer;
    receiving, at the configuration system, a second different configuration rule from a second manufacturer, the second configuration rule pertaining to a second product associated with the second manufacturer, wherein the first product and the second product are of the same type, and wherein the first configuration rule is of a different type than the second configuration rule;
    storing the first configuration rule and the second configuration rule in the configuration system; and
    configuring one or more products by executing the configuration rules to determine compatibility of the configuration attributes selected by an end-user using the configuration system,
        wherein the configuration system causes a first configuration control and a second different configuration control to be displayed to the end-user,
        the first configuration control being associated with the first configuration attribute, and the second configuration control being associated with the second configuration attribute, and
        wherein the configuration system modifies a value associated with the first configuration control based on the end-user's selection in the second configuration control.

2. The method of claim 1, wherein the first configuration rule is associated with a first component of the one or more products, the first component being provided by the first manufacturer.

3. The method of claim 2, wherein the second configuration rule is associated with a second component of the one or more products, the second component being provided by the second manufacturer.

4. The method of claim 3, further comprising determining a compatibility status associated with (i) the first component and the second component and (ii) a third component with the second component.

5. The method of claim 4, wherein a configuration user provides a third configuration rule associated with the compatibility status.

6. The method of claim 1, wherein a configuration user provides a configuration rule associated with a compatibility status between the first configuration attribute and the second configuration attribute.

7. An apparatus for configuring a system, the apparatus comprising:
    a processor;
    an input device operatively coupled to the processor and a network;
    an output device operatively coupled to the processor and the network; and
    a memory device operatively coupled to the processor, the memory device storing a software application, the software application enabling:
        the output device to provide a configuration system for receiving and consolidating one or more configuration rules pertaining to configuration attributes of products from a plurality of manufacturers,
            the configuration attributes being selectable component configuration parameters, and the configuration rules comprising logic that analyzes whether a first configuration attribute is compatible with a second configuration attribute,
                wherein the configuration rules associated with the plurality of manufacturers are not maintained at the configuration system but rather are maintained by the plurality of manufacturers, and
                wherein the configuration system maintains non-manufacturer rules in addition to the one or more configuration rules received from the plurality of manufacturers, the non-manufacturer configuration rules pertaining to the configuration attributes from the one or more configuration rules received from the plurality of manufacturers;
        the input device to receive, at the configuration system, a first configuration rule from a first manufacturer, the first configuration rule pertaining to a first product associated with the first manufacturer;
        the input device to receive, at the configuration system, a second different configuration rule from a second manufacturer, the second configuration rule pertaining to a second product associated with the second manufacturer, wherein the first product and the second product are of the same type, and wherein the first configuration rule is of a different type than the second configuration rule;
        the memory device to store the first configuration rule and the second configuration rule in the configuration system, the first configuration rule and the second configuration rule being stored in a predetermined format; and the software application to configure one or more products by executing the configuration rules to determine compatibility of the configuration attributes selected by an end-user using the configuration system,
  wherein the software application causes a first configuration control and a second different configuration control to be displayed to the end-user,
  the first configuration control being associated with the first configuration attribute, and the second configuration control being associated with the second configuration attribute, and
  wherein the software application modifies a value associated with the first configuration control based on the end-user's selection in the second configuration control.

8. The apparatus of claim 7, wherein the first configuration rule is associated with a first component of the one or more products, the first component being provided by the first manufacturer.

9. The apparatus of claim 8, wherein the second configuration rule is associated a second component of the one or more products, the second component being provided by the second manufacturer.

10. The apparatus of claim 9, wherein the software application determines a compatibility status associated with (i) the first component and the second component and (ii) a third component with the second component.

11. The apparatus of claim 10, wherein a configuration user provides a third configuration rule associated with the compatibility status.

12. The apparatus of claim 7, wherein a configuration user provides a configuration rule associated with a compatibility status between the first configuration attribute and the second configuration attribute.

13. A non-transitory computer readable memory storing a software application, the software application enabling:
  an output device to provide a configuration system for receiving and consolidating one or more configuration rules pertaining to configuration attributes of products from a plurality of manufacturers,
    the configuration attributes being selectable component configuration parameters, and
    the configuration rules comprising logic that analyzes whether a first configuration attribute is compatible with a second configuration attribute,
    wherein the configuration rules associated with the plurality of manufacturers are not maintained at the configuration system but rather are maintained by the plurality of manufacturers, and
  wherein the configuration system maintains non-manufacturer rules in addition to the one or more configuration rules received from the plurality of manufacturers, the non-manufacturer configuration rules pertaining to the configuration attributes from the one or more configuration rules received from the plurality of manufacturers;
  an input device to receive, at the configuration system, a first configuration rule from a first manufacturer, the first configuration rule pertaining to a first product associated with the first manufacturer;
  the input device to receive, at the configuration system, a second different configuration rule from a second manufacturer, the second configuration rule pertaining to a second product associated with the second manufacturer,
    wherein the first product and the second product are of the same type, and wherein the first configuration rule is of a different type than the second configuration rule;
  a storage of the first configuration rule and the second configuration rule in the configuration system, the first configuration rule and the second configuration rule being stored in a predetermined format; and
  the software application to configure one or more products by executing the configuration rules to determine compatibility of the configuration attributes selected by an end-user using the configuration system,
    wherein the software application causes a first configuration control and a second different configuration control to be displayed to the end-user,
    the first configuration control being associated with the first configuration attribute, and
    the second configuration control being associated with the second configuration attribute, and
    wherein the software application modifies a value associated with the first configuration control based on the end-user's selection in the second configuration control.

14. The computer readable memory of claim 13, wherein the first configuration rule is associated with a first component of the one or more products, the first component being provided by the first manufacturer.

15. The computer readable memory of claim 14, wherein the second configuration rule is associated a second component of the one or more products, the second component being provided by the second manufacturer.

16. The computer readable memory of claim 15, wherein the software application determines a compatibility status associated with (i) the first component and the second component and (ii) a third component with the second component.

17. The computer readable memory of claim 16, wherein a configuration user provides a third configuration rule associated with the compatibility status.

18. The computer readable memory of claim 13, wherein a configuration user provides a configuration rule associated with a compatibility status between the first configuration attribute and the second configuration attribute.

* * * * *